(12) United States Patent
Kim et al.

(10) Patent No.: US 11,452,071 B2
(45) Date of Patent: Sep. 20, 2022

(54) DISTRIBUTED TRANSMISSION RESOURCE ALLOCATION

(71) Applicant: Texas Instruments Incorporated, Dallas, TX (US)

(72) Inventors: Wonsoo Kim, Allen, TX (US); Il Han Kim, Frisco, TX (US); Jianwei Zhou, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/175,594

(22) Filed: Oct. 30, 2018

(65) Prior Publication Data

US 2020/0137719 A1    Apr. 30, 2020

(51) Int. Cl.
| | |
|---|---|
| *H04W 72/12* | (2009.01) |
| *H04W 72/00* | (2009.01) |
| *H04L 67/1097* | (2022.01) |
| *H04L 101/622* | (2022.01) |

(52) U.S. Cl.
CPC ....... *H04W 72/005* (2013.01); *H04L 67/1097* (2013.01); *H04W 72/12* (2013.01); *H04L 2101/622* (2022.05)

(58) Field of Classification Search
None
See application file for complete search history.

(56) References Cited

U.S. PATENT DOCUMENTS

| | | | | |
|---|---|---|---|---|
| 8,493,849 | B2 * | 7/2013 | Fuste Vilella | H04W 40/00 370/230 |
| 2011/0268101 | A1 * | 11/2011 | Wang | H04W 4/02 370/344 |
| 2012/0014357 | A1 * | 1/2012 | Jung | H04W 36/0088 370/332 |
| 2013/0170387 | A1 * | 7/2013 | Wang | H04W 4/70 370/252 |
| 2015/0201401 | A1 * | 7/2015 | Lahetkangas | H04W 28/26 370/329 |
| 2017/0034845 | A1 * | 2/2017 | Liu | H04W 28/0289 |
| 2018/0132182 | A1 * | 5/2018 | Hanley | H04W 52/0235 |
| 2018/0302911 | A1 * | 10/2018 | Aijaz | H04W 72/085 |
| 2019/0159201 | A1 * | 5/2019 | Jin | H04L 5/0032 |

\* cited by examiner

*Primary Examiner* — Kodzovi Acolatse
(74) *Attorney, Agent, or Firm* — Brian D. Graham; Charles A. Brill; Frank D. Cimino

(57) ABSTRACT

A selected network element is arranged for distributed transmission resource allocation conflict reduction. The selected network element receives a transmission from one of a first other network element and a second other network element and identifies at least one transmission resource indicated by the received transmission as being reserved by the first other network element and the second other network element. The selected network element stores an indication of each of the at least one identified transmission resource. In response to reading the stored indications, the selected network element selects a different transmission resource that is different from the transmission resource indicated by the stored indications. The selected network element transmits a transmission from the selected network element using the selected different transmission resource.

15 Claims, 4 Drawing Sheets

DISTRIBUTED TRANSMISSION RESOURCE ALLOCATION

BACKGROUND

Computer networks are arranged to distribute information electronically between networked devices, such as computers and "intelligent" devices. As costs of processing a given amount of information continue to decrease, greater numbers of devices are networked together using a common medium. As greater numbers of networked devices are networked together across a common medium, the probabilities for overloading the medium bandwidth and/or generating access "collisions" are increased. The overloading and contention for access can slow the performance of at least one such networked device.

SUMMARY

A selected network element is arranged for distributed transmission resource allocation conflict reduction. The selected network element receives a transmission from one of a first other network element and a second other network element and identifies at least one transmission resource indicated by the received transmission as being reserved by the first other network element and the second other network element. The selected network element stores an indication of each of the at least one identified transmission resource. In response to reading the stored indications, the selected network element selects a different transmission resource that is different from the transmission resource indicated by the stored indications. The selected network element transmits a transmission from the selected network element using the selected different transmission resource.

DETAILED DESCRIPTION

Figure 1:
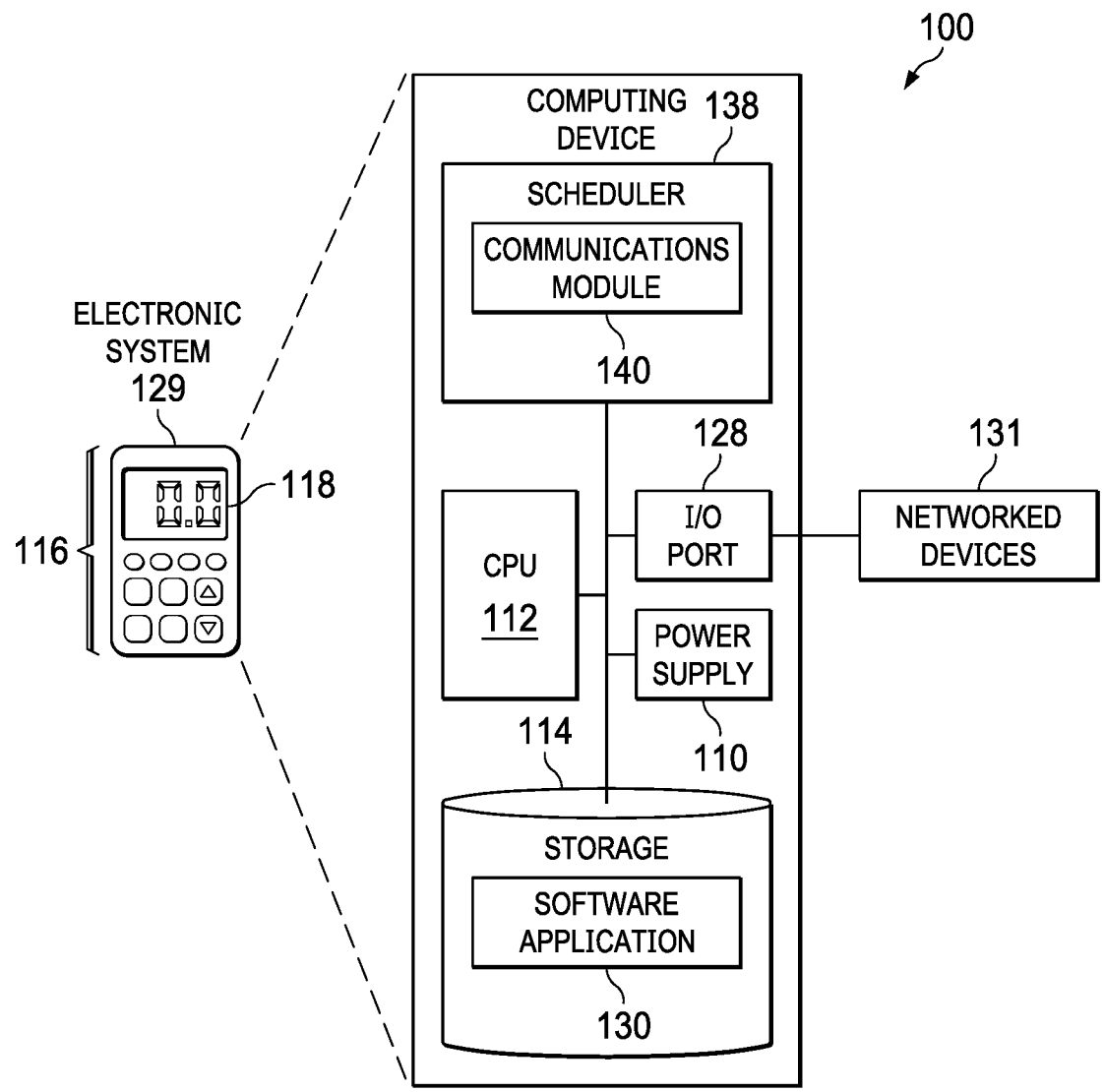
FIG. 1 is a block diagram of an example computing device that includes an example scheduler for distributed transmission resource allocation conflict reduction.

In at least some networked systems, various computers and devices (e.g., network nodes) seek to access network resources (e.g., via a network medium) in an at least partially uncontrolled manner. When nodes access the network in such an unscheduled manner, collisions between nodes attempting to access the network at the same time can occur. Such collisions can slow the network communication rate, and, when the network is operating at near capacity, the network can be overloaded, and transmission latencies of the network disproportionately increased. Moreover, the collisions can decrease the power efficiencies of low power devices employed as nodes on the network.

In some networks, a central node can manage the network access of devices capable of accessing the network. Such access can include: determining when particular devices can use network resources (e.g., selecting particular timeslots); and determining what frequencies (e.g., selecting channels) can be used at a particular time. The nodes of the network can be: added to (or removed from) the network as needs arise (e.g., as determined by the central node); structured in a branched architecture in which the central node is directly connected to child nodes; and indirectly connected to grandchild (e.g., and more distant relationships) nodes, for example. As the network structure adds more nodes (e.g., whether added by a central node or otherwise added), the communications between the various levels (e.g., including great-grandchildren, great-great-grandchildren, and more distant relations) are more greatly increased.

As the number of communications between the distant relation nodes increase, the scheduling and routing functions performed by the central node on behalf of the distant relation nodes increases. The central node can control networking of distant nodes by sending and receiving multi-hop control commands to the distant nodes. However, the use of such control commands decreases the availability of the network medium for other messages, and increases the power consumed by the intermediate nodes used by the network to forward such control commands to the destination nodes.

As described herein, a scheduling protocol (e.g., including scheduling commands) for distributed scheduling can be used to notify network node neighbors of at least one future cell transaction. (A cell can be a particular channel to be used during a particular timeslot, such as described hereinbelow with respect to FIG. 3.) The distributed scheduling can be scheduling determined by nodes other than a central node of the network. The distributed scheduling can allow remote nodes to reserve the use of network resources (such as cells) for the exclusive use of the reserved network resource. The use of the scheduling protocols described herein can reduce the amount of processing and forwarding of centrally generated (e.g., under the command of a central node) scheduling commands.

The task of the reserving cells can be offloaded from the central node and assigned to remote pairs of network neighboring nodes (e.g., network nodes within transmission range of each other). The cells can be reserved in response to negotiations by a given pair of network neighboring nodes, in which the negotiations are conducted using network transmissions point-to-point between the nodes of the given pair of neighboring nodes. The distributed negotiations for reserving cells for future network transmissions can reduce network access collisions that might occur when a central node attempts to reserve the cells (and to promulgate the cell reservations to all or some nodes of the network).

Remotely negotiating cell usage between distant pairs (from the central node) of network neighbors can provide more efficient usage of network resources in a more evenly distributed manner. As described herein, example distributed transmission resource allocation conflict reduction techniques (e.g., methods and apparatus) can improve network performance of nodes (e.g., both hidden neighbor nodes and exposed neighbor nodes) independently of a central node. An example of a transmission resource is a cell, which is associated with (e.g., which identifies) a unique timeslot and channel combination for channel hopping (as described hereinbelow).

FIG. 1 is a block diagram of an example computing device 100 that includes an example scheduler 138 for distributed transmission resource allocation conflict reduction. For example, the device 100 is, or is included within, and/or is coupled (e.g., connected) to an electronic system 129, such as a computer, electronics control box or display 118, controllers (including wireless transmitters or receivers), or any type of electronic system for processing information.

The example device 100 includes a substrate for including a processor (CPU) 112, a memory storage 114, a power supply 110, a user/system interface 116, an I/O (input/output) port 128, and a scheduler 138.

In an implementation, the processor (CPU) 112 is arranged to execute instructions (e.g., software application 130 stored in memory storage 114), which, when executed by the processor 112, transform the processor 112 (and device 100) into a special purpose machine configured to perform at least one specific function or task. The memory storage 114 may be a non-transitory computer readable storage medium storing the instructions. For example, the processor 112 can execute a software application 130 stored in the memory storage 114. When the processor 112 executes of the software application 130 as described herein, the processor 112 becomes a scheduler for distributed transmission resource allocation conflict reduction.

The processor 112 can be microprocessor, a microcontroller, a digital signal processor (DSP), and the like. The processor 112 can also be any programmable digital module or ad hoc circuit for processing signals or data. The processor 112 is arranged to read and write selected data (e.g., encapsulated within network packets) to and from networked devices 131.

As described hereinbelow (e.g., with respect to FIG. 4 and FIG. 5), the processor is arranged to execute instructions: for identifying at least one transmission resource indicated by a received transmission as being reserved by a first other network element and a second other network element; for storing in a storage of a network element an indication of the at least one identified transmission resource; and for selecting different transmission resources for transmission by the network element, in which the selected different transmission resources are different from any transmission resource indicated by the stored indication of the at least one identified transmission resource.

In an implementation, the memory storage 114 can be volatile (e.g., losing stored information when powered-down) and/or non-volatile (e.g., retaining information when powered-down). Volatile memory can include static memory (static random access memory (SRAM), which can be active feedback circuitry-based) and/or dynamic random access memory (DRAM, which can be capacitor-based). Non-volatile memory can include read-only memory (ROM), programmable read-only memory (PROM), erasable programmable read-only memory (EPROM), flash memory, hard disks, solid-state disks, compact disc read only memory (CD-ROM) (e.g., including reprogrammable CD-ROM), DVD-ROM, cloud storage, memory sticks and/or any suitable device used for retaining information. The memory storage 114 can store information (e.g., code and operational data) accessed in the context of an execution environment in which one or more software applications 130 can implement (and/or be used by) the techniques described herein. The memory storage 114 can be a tangible medium.

In an implementation, the power supply 110 is arranged to supply electrical current for powering components of the example device 100. The power supply 110 can optionally supply electrical current (or electrical fields) for powering devices networked (e.g., networked wirelessly or cabled) to the example device 100.

In an implementation, the device 100 can be controlled in response to a user and/or in response to measured system parameters received via the user/system interface 116. The user/system interface 116 can include hardware sensors and indicators (e.g., display 118) for outputting information to users and other devices, and for receiving information from the user, sensors, and other devices during the execution of a software application 130 by the device 100.

For example, the user/system interface 116 can include an input/output (I/O) port 128 for networking (e.g., providing information to and/or receiving information from) networked devices 131. The input/output port includes a transceiver (e.g., 218, described hereinbelow with respect to FIG. 2) for receiving a transmission from one of a first other network element (e.g., network node and/or network devices) and a second other network element.

The networked devices 131 can include any device capable of point-to-point and/or networked communications with the device 100. The networked devices 131 can include tangible, non-transitory media (such as flash memory) and/or cabled or wireless media. The networked devices can be selectively coupled (e.g., networked) to the device 100 by external devices via wireless or cabled connections.

The scheduler 138 includes a communication module 140 for generating and consuming (e.g., reading) example network commands for distributed scheduling of network resources. The network resources can include systems and protocols for reserving access to selected channels of the network medium during selected times. The communication module 140 can implement higher- and lower-level functions of standard network models (examples of which are described hereinbelow with reference to FIG. 2).

Figure 2:
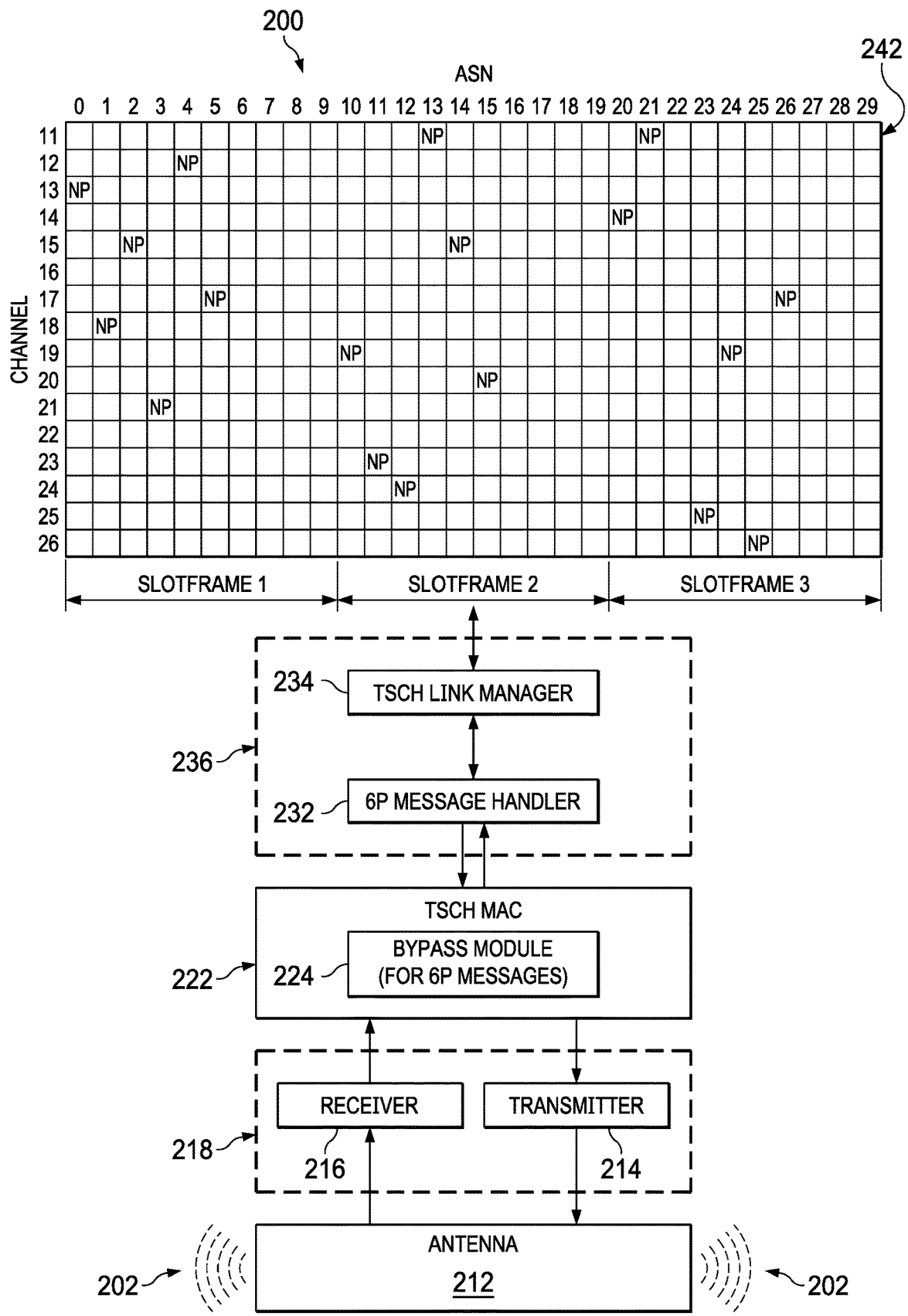
FIG. 2 is a block diagram illustrating a network architecture of an example network node for distributed transmission resource allocation conflict reduction.

FIG. 2 is a block diagram illustrating a network architecture of an example network node for distributed transmission resource allocation conflict reduction. The network stack 200 is an example network stack for controlling access to a network medium. The network stack 200 is described hereinbelow using the Institute of Electrical and Electronic Engineers (IEEE) Time Slotted Channel Hopping (TSCH) protocol (802.15.4e) as an example networking application. The network stack 200 is illustrative and can optionally use various selected protocols that differ from the illustrated protocols.

The Open Systems Interface (OSI) network model is described in terms of layers. The example network stack 200 includes: a physical layer; a MAC (medium access control) layer; a network layer; and a transport layer for interfacing with an application layer. The layers can be embodied as hardware (e.g., including at least components of the physical layer) and/or as software (e.g., by hardware configured by and/or controlled by functional data/instructions stored in memory). Generally, the operability provided by some portions of lower layers can be implemented as dedicated hardware, whereas functions provided by the higher layers can be implemented as software and data for instantiating logic circuits for monitoring and controlling the hardware of the lower layers.

The physical layer includes an example coupler 218. The coupler 218 is arranged for transmitting and receiving information across a network medium via an antenna 212. The information can be transmitted and received as waveforms 202 propagated wirelessly through the medium (e.g., propagated as modulated radio frequency transmissions, light, and/or other media that can be modulated) and/or propagated through a solid physical medium (e.g., propagated using electrical lines, fiber optic cables, waveguide, and/or other such conduits).

The example media coupler 218 includes (and/or is coupled to) a transmitter 214 and a receiver 216. The transmitter 214 is arranged to drive the antenna 212, so that information to be transmitted over the network medium is encoded (e.g., modulated) as radio frequency energy (e.g., using high frequency modulation) and broadcast wirelessly as modulated radio frequency energy through space. The receiver 216 is arranged to receive modulated radio frequency energy (e.g., transmitted from neighboring network nodes), so that transmitted encoded information can be decoded (e.g., demodulated) and forwarded (e.g., upward) in the network stack 200 from the receiver 216 to the TSCH MAC processor 222 for processing (e.g., for processing locally within the device in which the network stack 200 is instantiated).

The MAC (media access control) layer of the network stack 200 includes, for example, the TSCH MAC processor 222. The TSCH MAC processor 222 is arranged for address filtering of received packets decoded from received modulated radio frequency energy. The address filtering can include evaluating addresses of the received packets to determine, for example, the sending and destination addresses of each received packet. The sending address can be associated with a first network element (a first network node having a first unique physical address), and the destination address can be associated with a second network element (a second network node having a second unique physical address). The TSCH MAC processor 222, for example, can decode a received packet to determine the address of the network node sending the packet for reception by the instant network node, and can encode a to-be-transmitted packet to include an address of the instant network node (e.g., an address associated with the device in which the network stack 200 is instantiated).

As described herein, the bypass module 224 is arranged for evaluating whether a packet received by the instant network node includes any distributed scheduling commands. The bypass module 224 can evaluate—irrespectively of a destination address of a received packet—whether a packet received (e.g., from any network node within range of the instant network node) by the instant network node includes any distributed scheduling commands (such as "6PX" commands—described hereinbelow with respect to FIG. 4 and FIG. 5—or IEEE "6P" commands). In response to a determination that a received packet includes distributed scheduling commands (including distributed scheduling commands that are "requests," "confirmations," and/or "acknowledgements"), the received packet is forwarded in the network stack 200 to the 6P message handler 232 of the link manager 236. (The 6P message handler 232 is arranged to handle as described herein the "6PX" extended commands for distributed scheduling.) The use of the bypass module 224 can reduce the power consumed and time otherwise required for sending scheduling information to nodes that are addressed as a destination address of a transmitted packet.

The message handler 232 evaluates the forwarded packets including distributed scheduling commands regardless of whether, for example, the forwarded (e.g., forwarded in the network stack 200) packet has been addressed to the instant network node. The message handler evaluates the forwarded packet to determine, for example, whether the included command includes scheduling information for making and/or confirming cell reservations. In response to the determination that the forwarded command includes scheduling information for cell reservations, the command is forwarded (e.g., upward) in the network stack 200 to the TSCH link manager 234. (Not forwarding non-scheduling commands not addressed to the instant network node in the instant network stack can save power, reduce heat, and reduce latencies of the instant network node.)

The TSCH link manager 234 is arranged for updating the reservation system 242 with cell reservations being made to adjacent network nodes. (An example of a cell reservation system 300 is described hereinbelow with respect to FIG. 3.) The adjacent network nodes can be network nodes that are exposed (e.g., having previously received direct network commands from the exposed node or from a central node for managing the network) or that are hidden (e.g., not having previously received direct network commands from the exposed node or from a central node for managing the network). The TSCH link manager 234 can use scheduling information included in received packets (including received packets not addressed to the instant network node) to update the instant reservation system 242 with scheduling information negotiated by (and between) various pairs of network nodes. The reservation system 242 can include an indication of the particular node pair (NP) of neighboring nodes that negotiate (e.g., mutually negotiate) a reservation for a particular cell.

As described hereinbelow with respect to FIG. 4 and FIG. 5, a local application coupled to higher levels of the network stack 200 can generate a request for generating a network transaction to be sent from a first node (e.g., the instant node) to a second node (e.g., the destination and/or selected neighboring node). In response to requests for generating a network transaction from the instant node, the link manager 236 (for example) determines the amount of a requested number of cells to be used for sending the requested network transaction. The link manager includes the TSCH link manager 234 and the 6P message handler 232 (and the functions thereof).

The particular cells to be reserved for the requested network transmissions are selected by the TSCH link manager 234 in communication with the reservation system 242. The TSCH link manager 234 can query the reservation system 242 to determine which cells have been previously allocated, so that previously allocated cells (allocated by the instant node or other nodes) remain uniquely associated (within the instant reservation system 242) with the node pair originally allocating the at least one respective allocated cell. The unique association of each cell helps ensure allocated cells are not interfered with by neighboring nodes during transmissions by a node of the node pair. Storing the node pair information in the instant reservation system 242 allows each reservation system to be used for the two separate functions of determining when to transmit, and determining when not to transmit (which, for example, can reduce latency, power, and memory requirements of a reservation system).

The selected cells are included as list of candidate cells in distributed scheduling commands. The list of candidate cells includes at least one cell, and includes more cells (when successful) than the number of cells determined by the link manager 236. The list of candidate cells can be used to determine whether a selected destination node has vacancies in a scheduling system of the selected destination node for the selected cells. A distributed scheduling command that includes the list of candidate cells is transmitted from the instant network node to the destination node to confirm, for example, whether the selected cells are available with respect to the destination node.

In the two- and three-communication negotiation examples generally described herein following, the requested number of particular cells to be used for the requested network transaction is determined by a negotiation between a pair of nodes (node pair). The node pair for negotiations includes an instant (e.g., initiating) node and a selected neighboring node.

In a two-communication negotiation transaction (described hereinbelow with respect to FIG. 4): in a first communication, the instant node selects at least the requested number of unreserved (e.g., available) particular cells from the instant reservation system 242 as a candidate cell list (that includes cells unreserved by the instant node) for sending to the selected neighboring node; and, in a second communication, the selected neighboring node responds by sending an allocable cell list that includes the requested number of particular cells selected from the candidate cell list. As further described hereinbelow with respect to FIG. 4, at least one other neighboring node (e.g., other than the instant node and the selected neighboring node) can receive a transmission (e.g., from one of the instant node and the selected neighboring node) that includes the allocable cell list. For example, the at least one other neighboring node can store cells from the allocable cell list (e.g., in a local storage that includes a local reservation system), so that the at least one other neighboring node does not interfere with transmissions by one of the instant node and the selected neighboring node transmitted in accordance with the stored cells from the allocable cell list.

In a three-communication transaction (described hereinbelow with respect to FIG. 5): in a first communication, the instant node requests a number of unreserved (e.g., available) particular cells from the selected neighboring node; in a second communication, the selected neighboring node responds by sending a candidate cell list that includes at least the requested number of unreserved particular cells from the reservation system 242 of the selected neighboring node; and, in a third communication, the instant node responds to the selected neighboring node by selecting and sending a cell list that includes the requested number of particular cells selected from the candidate cell list. As further described hereinbelow with respect to FIG. 5, at least one other neighboring node (e.g., other than the instant node and the selected neighboring node) can receive a transmission (e.g., from one of the instant node and the selected neighboring node) that includes the allocable cell list.

With reference again to FIG. 2, distributed scheduling commands generated by the message handler 232 are forwarded (e.g., down the network stack 200) to the TSCH MAC processor 222. The TSCH MAC processor generates addressed packets to be transmitted to a destination node. The packets generated by the TSCH MAC processor 222 are sent to the media coupler 218 for transmission across the network to a selected neighboring node by network transmitter 214 via the antenna 212.

Figure 3:
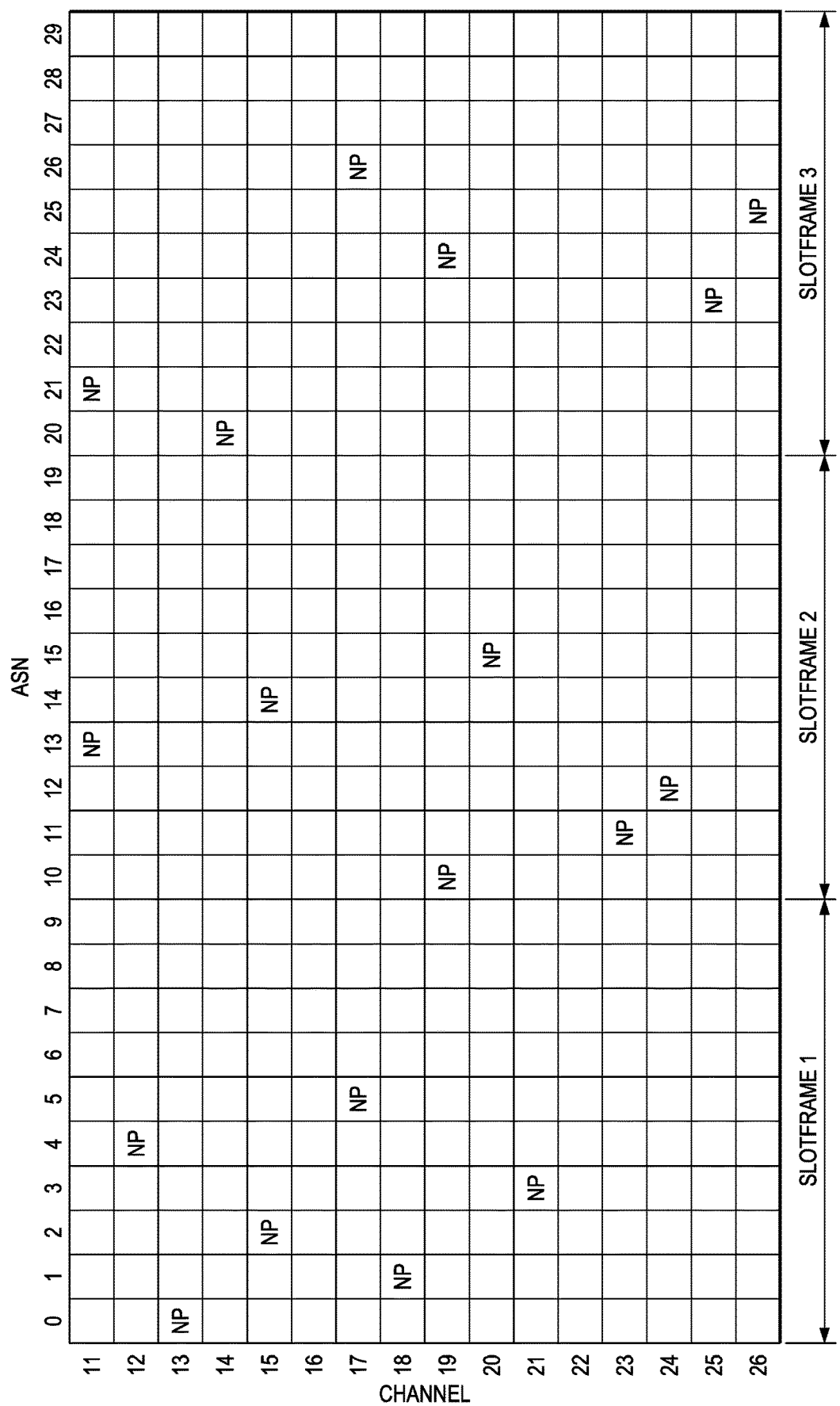
FIG. 3 is a data structure diagram showing an example channel-based reservation system for allocating timeslots in a channel hopping network protocol.

FIG. 3 is a data structure diagram showing an example channel-based reservation system for allocating timeslots in a channel hopping network protocol. An instance of the reservation system 300 can be instantiated in each network node of a TSCH network. Each of the network nodes can "hop" to different channels at particular times (e.g., network times) in accordance with the information stored within a local reservation system 300 (e.g., local to the reservation system of a given network node making a channel hop).

The reservation system 300 includes a series of sequentially ordered (e.g., ordered in time) slotframes (e.g., slotframe1, slotframe2, and slotframe3). Each slotframe includes a series of sequential timeslots. Each timeslot includes an array of cell entries, in which each cell entry is associated with a respective channel in the timeslot. Each cell stores an indication (e.g., identifier) of a particular node and/or particular node pair (NP) in a network for which (e.g., by which) a cell reservation has been negotiated. For example, each cell entry can indicate which network node (or which node pair) has reserved a particular channel in a particular timeslot within a particular slotframe.

The particular timeslots of various slot-frames can be designated using Absolute Slot Numbers (ASN). When the network time (e.g., the time of day) reaches a particular timeslot containing channel reservations, each network node having a reservation within the particular timeslot can transmit data across the medium. Moreover, neighboring nodes other than the indicated node(s) in respective local reservation system can be preempted from transmitting over the cells reserved by other nodes and node pairs. (The entry into a local reservation system of a node of indication of cells reserved by other nodes and/or node pairs is described hereinbelow with respect to FIG. 4 and FIG. 5). Each network node associated with a cell entry can transmit data using the particular channel during the particular timeslot indicated by the cell (e.g., when the network time falls within the particular timeslot of the cell). For example, each local node consults the local reservation to determine whether a particular cell has been reserved: when the particular cell has been reserved by a node pair that does not include an instant node, the instant node is arranged to allocated a different cell (which reduces the chance for a collision of the particular cell by the instant node).

Figure 4:
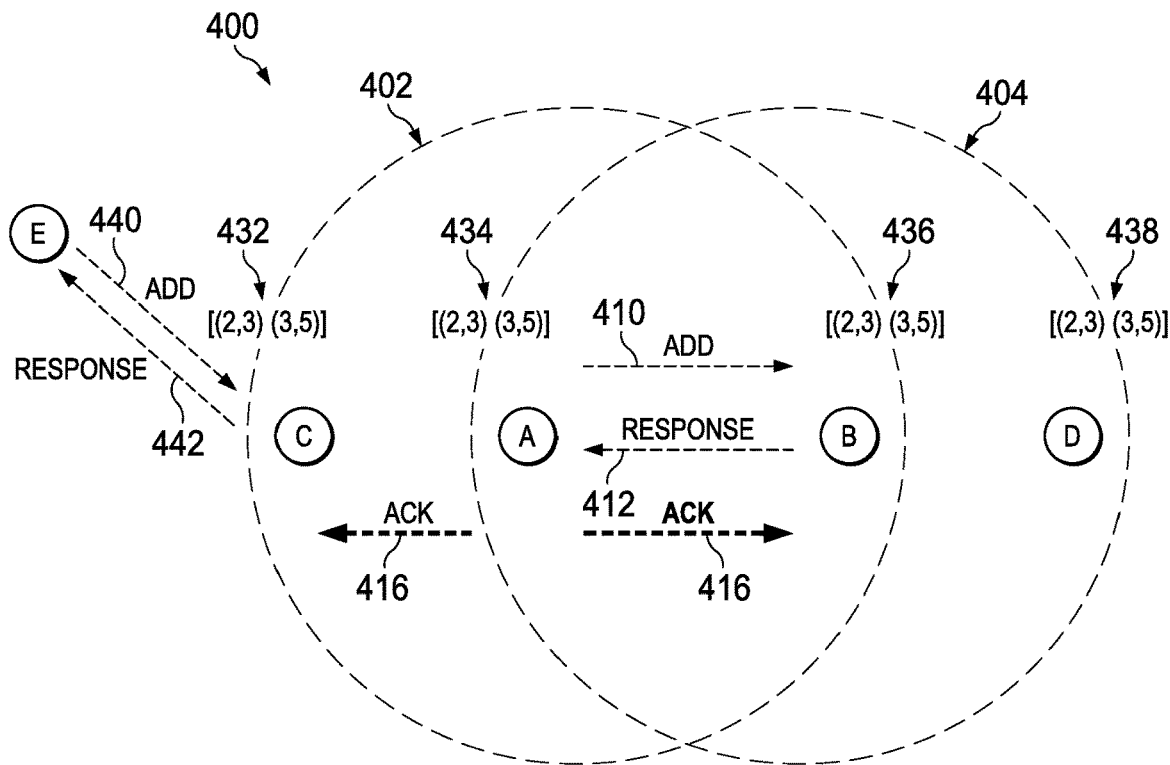
FIG. 4 is a network transaction diagram of an example protocol for distributed transmission resource allocation conflict reduction.

FIG. 4 is a network transaction diagram of an example protocol for distributed transmission resource allocation conflict reduction. Network 400 is a TSCH network, which includes nodes A, B, C, D and E. In low power wireless applications, for example, some network nodes coupled to the network medium might not have direct access to all other nodes coupled to the medium. For example, node A has a transmission range 402, and node B has a transmission range 404. The ranges 402 and 404 are partially overlapping (and node E is only accessible by node C), so that: nodes B and C are within range of node A; nodes A and D are within range of node B; nodes A and E are within range of node C; node B is within range of node D; and node C is within range of node E. Nodes that are within a transmission range of each other are neighboring nodes, and nodes that are outside of the transmission range are remote nodes (e.g., indirect nodes).

Cell allocation includes generating reservations for use of a particular channel of a timeslot as negotiated between a pair of neighboring nodes. Such cell allocation can be made using the 6P IEEE protocol, which is serviced by the (e.g., lower) TSCH MAC layer, described hereinabove. In the 6P IEEE protocol, a requesting node (which requests cells to be allocated) negotiates with a selected receiving node (which responds to the cell allocation requests). The negotiation for allocating cells can include a series of communications in which the transmitting node and the selected receiving node both transmit and receive (e.g., in which the series of communications can be ordered in a question and answer format).

The 6P IEEE protocol includes a 6P ADD Request for negotiating a selection of mutually allocated cells between a pair of neighboring nodes. In a two-communication 6P ADD Request transaction, a requesting node (e.g., node A) initiates a request for allocating cells by querying a selected neighboring node (e.g., node B).

The request for negotiating a selection of at least one cell to be allocated is initiated by node A transmitting the 6P ADD Request 410. The 6P ADD Request 410 (e.g., of a two-communication transaction addressed to node B) is a scheduling command that includes, as arguments, a number of allocable cells (e.g., to-be-allocated cells) requested and a list of cells allocable by node A. For example, the 6P ADD Request 410 of a two-communication transaction can include:

6P ADD Request
NumCells=2
CellList=[(1,2), (2,2), (3,5)]

in which the NumCells includes the number of cells requested for allocation, and in which the CellList includes a candidate list of three candidate allocable cells. The candidate allocable cells can be cells that are not previously allocated by the requesting node (e.g., not previously reserved in the reservation system of node A). Each of the included candidate allocable cells includes a respective indication of a unique timeslot and channel combination for the candidate allocable cell. Each cell can be arranged as tuple of two integers: the first integer is an indication of a particular timeslot, for example; and the second integer is an indication of a particular channel, for example.

The selected neighboring node (e.g. node B) receives and evaluates the 6P ADD Request 410. In response to the 6P ADD Request 410, the selected receiving node selects (if successful) the requested number of cells: the requested number of cells are selected in response to the received cell list and in response to the reservation system (e.g., table for indicating allocable cells) of the selected receiving node. The selected receiving node (e.g., node B) responds to the 6P ADD Request 410 by transmitting a 6P Response 412 reply (e.g., by transmitting a packet addressed to node A). For example, the 6P Response 412 of a two-communication transaction can include:

6P Response
Return Code=RC_SUCCESS
CellList=[(2,2), (3,5)]

where the Return Code indicates whether the response to the 6P ADD Request 410 is successful, and where the cell list 436 includes a list of two mutually allocated cells (where the allocable cells are mutually allocated with respect to the requesting node and the selected receiving node, such as nodes A and B, respectively). The Return Code of RC_SUCCESS and a non-empty CellList indicates a successful negotiation between Node A and the Node B for allocating the cells of the CellList. The selected receiving node updates the selected receiving node reservation system to include stored information for indicating the allocable cells of the cell list of the 6P Response 412 (e.g., by storing a respective indication for each cell negotiated for allocation by the instant node pair).

In response to receiving the 6P Response 412, the requesting node updates the reservation system of the requesting node to include (e.g., to allocate) the cells returned by the cell list 6P Response 412. The reservation system of the requesting node can be updated by storing therein an indication of the timeslot and channel combination for each of the mutually allocated cells of cell list 434 (the indication can include information for identifying the instant node pair).

After the conclusion (e.g., after the successful execution) of the two-communication 6P ADD Request 410 and 6P Response 412, the reservation systems of nodes A and B respectively include the mutually allocated cells of the allocated cell lists 434 and 436. However, the node C and node D reservation systems do not necessarily include the allocated cells (within the respective reservation systems) of node A and node B. The node C and node D reservation systems do not necessarily include the allocated cells because, for example, the nodes C and D did not participate in the negotiations between nodes A and B to allocate the allocated cells. When the node C and node D do not include the mutually allocated cells in the cell lists 434 and 436, either (or both) node C or node D and can act as an "interferer" by transmitting using (e.g., transmitting over the timeslot-channel combination indicated by) at least one of the cells previously mutually allocated by nodes A and B.

Moreover, node C transmissions can interfere with transmissions from node A by using a cell previously allocated by node A (but not negotiated between nodes C and A), whereas node D transmissions can interfere with transmissions from node B by using a cell allocated by node B (but not negotiated between nodes D and B).

In an example of interference by node C, node E can generate a 6P ADD Request 440 that includes the example cell list 432. The cell list 432 includes (for example) the cells (2,3) and (3,5) that were previously allocated by Nodes A and B independently of Nodes C or E. When node C has not previously allocated the nodes in the cell list 432, node C can respond to the 6P ADD Request 440 by transmitting a 6P Response 442 with a "successful" return code for allocating the cells (2,3) and (3,5). Both nodes C and E allocate the cells indicated by the cell list 432. When node C transmits over timeslot channels (cells) indicated by the cell list 432, transmissions by node A (which are scheduled in response to the cell list 434) use the same channels at the same times as the transmissions of node C. The interference can be caused when both neighboring nodes A and C transmit using the same channel during the same timeslot, for example.

In a similar manner, an intermediate node (not shown) lying within the intersection of ranges 402 and 404 can interfere with transmissions from either (or both) node A and B when the intermediate node transmits using a cell allocated by nodes A and B. For example, the intermediate node can transmit at the same times and channels indicated by the cell lists 434 and 436. When any intermediate node transmits using any of the same timeslot and channel combinations indicated by the cell lists 434 and 436, the transmissions of the intermediate node can interfere with transmissions from nodes A and B.

As described herein, the node D can selectively "sniff" transmissions from node B (and the node C can selectively sniff transmissions from node A), for example, by selectively bypassing MAC layer filtering. In the two-transmission 6P Response 412, the list of mutually allocable cells is transmitted as an argument by node B, so that node D (e.g., in response to the bypass module 224 identifying a "6P" or "6PX" message) can extract the list of mutually allocable cells. Node D can extract the list of mutually (between nodes A and B) allocable cells by receiving and sniffing the 6P Response 412 (e.g., despite node D not being included in an address of the communication and/or packet by which the 6P Response 412 is transmitted). In response to the extraction by node D of the mutually allocable cells from the node B transmission (negotiated with node A), the node D can update the reservation system of node D to include the extracted mutually (between nodes A and B) allocable cells (e.g., by including cell list 438).

When the allocated cells negotiated by other nodes are included in the reservation system of node D, the probability of the occurrence of interfering transmissions between neighboring nodes of the network 400 is reduced. The allocated cells negotiated by other nodes can include cells not mutually allocated with respect to node D. For example, updating the reservation system of node D (to include the cells negotiated between nodes A and B by extracting the cell list from the node B transmission 412) prevents node D from interfering with node C. Node D is prevented from interfering with node C because, for example, node D selects cells for allocation that are different from any of the cells included in the node B transmission 412. Node D can store indications such extracted cells (from any received allocated cell list from any node pair) in the reservation system of node D, so that node D can read the stored indications of a cell allocated mutually between other node pairs and select unreserved cells for allocation by node D as a transmission resource. Preventing node D from interfering with cells reserved by other cells reduces, for example, distributed transmission resource allocation conflict reduction.

Node C is out of range of node B, so that node C cannot extract the allocable cells from the node B transmission 412 to node A. Assuming, for example, node C can sniff the 6P ADD Request 410 transmitted by node A (e.g., in response to the bypass module 224 identifying a "6P" or "6PX" message), the node C could allocate each of the cells in the candidate cell list of the 6P ADD Request 410. However, the 6P ADD Request 410 candidate cell list transmitted by node A includes more cells than are ultimately allocated. When node C allocates each of the cells in the candidate cell list of the 6P ADD Request 410, cells that are not subsequently allocated by a mutual negotiation (e.g., cell (1,2) of the 6P ADD Request 410) can be allocated by node C. The node C allocation of more cells than the cells actually allocated by node A results in a potential waste of channel resources. The allocation of cells from a candidate cell list by a node other that the node pair negotiating the cell allocation can result in a waste of channel resources because, for example, the cell (1,2) would not be otherwise available for communications between node C and node E. For example, neighboring nodes that are not specifically listed as a destination address, and that are capable of potentially interfering (e.g., by being in range of a transmitting node), can passively accrue scheduling information for avoiding interference over cells reserved by other nodes (e.g., reserved by negotiations between node pairs), so that the passively accrued schedule information need not have been accrued using separate transactions to identified nodes, and so that hidden nodes need not be discovered before being able to accrue the scheduling information.

As described herein, a "6PX Acknowledgement" (ACK) 416 command can be transmitted to neighboring nodes. (The term "6PX" indicates an extension, as described herein, to the "6P" protocol.) The 6PX Acknowledgement 416 is a scheduling command that includes, as arguments, the number of allocable cells and a list of cells allocated by node A. For example, the 6PX Acknowledgement 416 can be transmitted after the 6P Response 412 of a two-communication transaction. The example 6PX Acknowledgement 416 can include:

6PX ACK Broadcast
NumCells=2
CellList=[(2,2), (3,5)]

in which the Broadcast identifier indicates the ACK command is to be broadcast as a broadcast packet (e.g., as compared against being unicast), the NumCells includes the number of cells allocated, and the CellList includes a list of the two allocated cells. A non-zero value of NumCells and a non-empty CellList indicates a successful negotiation between Node A and the Node B for allocating the cells of the CellList. The 6PX Acknowledgement 416 can be received by the neighboring nodes of node A that are not the neighboring nodes of node B (e.g., can be received by any node that is within transmission range of node A). (The 6PX ACK 416 command can also be sent to any selected neighboring node (e.g., using MAC addressing), so that any neighboring node can sniff the transmitted list of allocated cells and update its respective reservation system to include the sniffed list of allocated cells.

The acknowledge command 416 is transmitted by the requesting node (node A), so that the cell list of the 6P Response 412 (transmitted by node B) can be received by nodes out of range of node B. Accordingly, the neighboring nodes of node A (such as node C) can allocate the same, exact cell nodes that have been mutually allocated between nodes A and B, so that any given node within ranges 402 and/or 404 is prevented from using cells negotiated by cell pairs that are different from the given node. For example, when node C allocates the same, exact cell nodes that have been mutually allocated between nodes A and B, node C does not waste channel resources (by reserving more cells than actually allocated), and the local reservation system on node C reduces inter-node interference by preventing the node C transmissions that use cells that have been mutually allocated between a pair of other nodes (e.g., nodes A and B).

The "6P" and the "6PX" header can be included in specified location in each of the "6P" and the "6PX" scheduling commands that are transmitted (by any transmitting node). Every neighboring node of the transmitting node (e.g., node A, the requesting node) can include a locally instantiated bypass module 224. The locally instantiated bypass module 224 can read the header of every "6P" and "6PX" command received from the transmitting node, so that every "6P" and "6PX" command received can be identified by the instant receiving node. In response to identifying that a received command is a "6P" or a "6PX" command, the locally instantiated bypass module 224 can forward (e.g., upward in the instant network stack) the received allocated cell list, so that the instant reservation system can include the cells of the allocated cell list. Allocated cells can be cells that are negotiated between, and reserved by, at least one node pair (e.g., of neighboring nodes).

As described hereinabove, nodes within range of the selected receiving node (that negotiates the allocable cells) can receive and process the cell list of allocable cells included within the 6P Response 412 transmission from the selected receiving node. In an example, the likelihood of interference is reduced for all nodes within ranges 402 and 404 when neighboring nodes of node A extract the cell list of the 6PX Acknowledgement 416 command, and when the neighboring nodes of node B extract the cell list of the 6P Acknowledgement 412 command.

Figure 5:
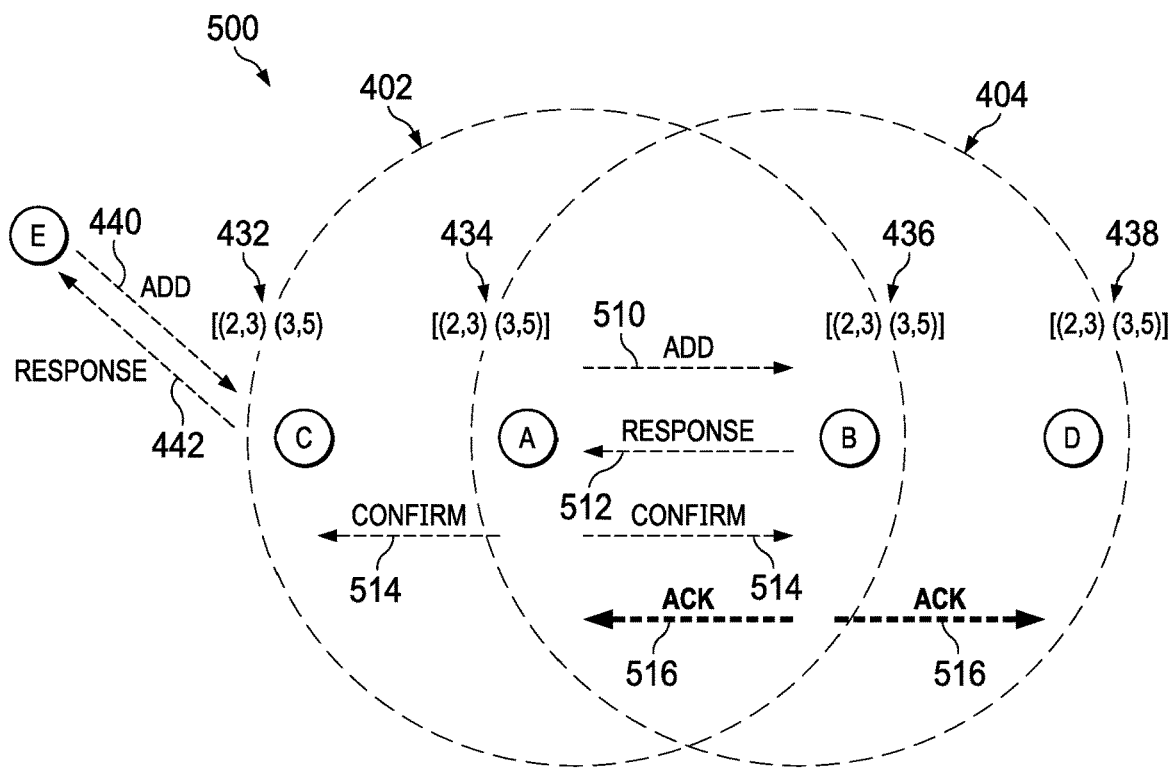
FIG. 5 is a network transaction diagram of another example protocol for distributed transmission resource allocation conflict reduction.

FIG. 5 is a network transaction diagram of another example protocol for distributed transmission resource allocation conflict reduction. Network 500 is a TSCH network, which includes nodes A, B, C, D and E arranged in a manner similar to the network 400, described hereinabove. Nodes that are within transmission range of each other are neighboring nodes.

The 6P ADD Request of the 6P IEEE protocol can be included in a three-communication transaction between a selected pair of neighboring nodes. In the three-communication transaction, the requesting node (e.g., node A) initiates a request for allocating cells by querying (e.g., sending a scheduling command to) a selected neighboring node (e.g., node B, where node B is a receiving node). The node A and node B are a "node pair" with respect to cells allocated in response to negotiations (e.g., scheduling commands for reserving mutually allocable cells) mutually identified, selected, and reserved between the node A and node B.

The 6P ADD Request 510 (which can be transmitted as a packet addressed to node B) is a scheduling command that includes, as arguments, a number of allocable cells requested and an empty list of cells for listing cells to be allocated by node B. For example, the 6P ADD Request 510 of a three-communication transaction can include:

6P ADD Request
NumCells=2
CellList=[ ]

in which the NumCells includes the number of cells requested for allocation, and in which the empty CellList indicates that the selected neighboring node is to select the requested number of allocable cells. The selected neighboring node (e.g., node B) is arranged to select the requested number of allocable cells in response to (e.g., by reading and comparing reserved cells stored in) the local reservation system of the selected neighboring node. In contrast with the two-communication transaction described hereinabove, the selection of the candidate allocable cells is made initially by determining a number (as large as or larger than the value of NumCells) of unreserved cells of the selected neighboring node reservation system.

The selected neighboring node (e.g., node B) evaluates the 6P ADD Request 510 and selects (if successful) at least the requested number of cells in response to the local reservation system of the selected neighboring node. The selected neighboring node responds to the 6P ADD Request 510 by transmitting a 6P Response 512 reply. For example, the 6P Response 512 of a three-communication transaction can include:

6P Response
Return Code=RC_SUCCESS
CellList=[(1,2), (2,2), (3,5)]

where the Return Code indicates whether the response to the 6P ADD Request 510 is successful, and where the CellList includes a list of three allocable cells selected in consultation with the local reservation system of the selected neighboring node. The response to the 6P ADD Request 510 is successful when the selected neighboring node (e.g., node B) can return a candidate cell list that includes at least the number of requested allocable cells. The candidate CellList can include a number of candidate allocable cells selected from the reservation system of the selected neighboring node. The number of candidate allocable cells selected from the reservation system of the selected neighboring node can be greater than the requested number of the 6P ADD Request 510.

The requesting node (e.g., node A) evaluates the 6P Response 512 and selects the requested number (e.g., as included as an argument in the 6P ADD Request 510) of cells from the received candidate cell list (e.g., from node B) and in response to the reservation system of the instant local node (e.g., node A). The requesting node updates the reservation system of the requesting node to include a selected subset of (e.g., all or fewer of) the candidate cells returned by the 6P Response 512.

The requesting node (e.g., node A) further responds to the 6P Response 512 by transmitting a 6P Confirmation (6P Confirm) 514 reply. For example, the 6P Confirmation 514 of a three-communication transaction can include:

6P Confirmation
Return Code=RC_SUCCESS
CellList=[(2,2), (3,5)]

where the Return Code indicates whether the 6P Confirmation 514 to the 6P Response 512 is successful, and where the CellList includes a list of allocated cells. The Return Code of RC_SUCCESS and a non-empty CellList indicates a successful negotiation between Node A and the Node B for allocating the cells of the CellList. The requesting node (e.g., node A) selects (e.g. allocates) cells for allocation from the received candidate cell list (e.g., from node B) in response to the reservation system of the instant local node (e.g., node A). For example, the requesting node selects cells from the received candidate cell list that are not indicated in the reservation system of node A as being allocated (by any node). In response to receiving the 6P Confirmation 514, the selected neighboring node updates the reservation system of the selected neighboring node to include an indication of the allocable cells returned by the cell list argument of the 6P Confirmation 514.

After the conclusion (e.g., after the successful execution) of either the two-communication or the three-communication 6P ADD Request, the reservation systems of both nodes A and B include the mutually allocated cells (e.g., of the allocated cell list [(2,2), (3,5)]). However, neither node C nor node D include the mutually allocated cells within the respective reservation systems of node C and node D, so that either (or both) node C or node D and can act as an "interferer" by transmitting using one of the cells previously mutually allocated by nodes C and D. As described hereinbelow, neighboring nodes (other than node A or node B, and within range 402) can selectively bypass MAC address filtering and extract the list of allocated cells included in the 6P Confirmation 514. The MAC address filtering for a received packet can be selectively bypassed in response to identifying a "6P" or a "6PX" scheduling command in the received packet.

In the three-transmission 6P ADD Request scheduling command sequence described hereinabove, the list of mutually allocable cells is identifiably transmitted by node A (e.g., in the 6P Confirmation 514 command). Node C can be arranged to selectively sniff communications by node A (e.g., after activating the bypass module 224 in response to identifying a 6P or 6PX message), and to extract the list of mutually allocable cells in the 6P Confirmation 514 command transmitted from node A. In response to the extraction of the mutually allocable cells from the node A transmission (to node B), the node C can update the reservation system of node C to include the extracted mutually allocable cells. Updating the reservation system of node C (e.g., to include the extracted mutually allocable cells from the node A transmission of 6P Confirmation 514) prevents node C from interfering with node A (e.g., where node C is prevented from transmitting on the same channel at the same times allocated by node A). Preventing node C from interfering with node A reduces, for example, distributed transmission resource allocation conflicts.

However, node D is out of range of node A, so that node D cannot extract the list of allocable cells from the node A 6P Confirmation 514 transmission to node B. In response to receiving the 6P Confirmation 514 transmission, node B (as described herein) transmits (e.g., unicasts or broadcasts) a 6PX ACK 516 transmission, so that any node inside of range 404 (and, for example, outside of range 402) can receive (via MAC address filtering or via selectively bypassing MAC address filtering) the list of allocated cells included in the 6PX ACK 516 transmission. A non-zero value of NumCells and a non-empty CellList passed as arguments of a 6PX ACK 516 transmission can indicate a successful negotiation between Node A and the Node B for allocating the cells of the CellList. Any node receiving the 6PX ACK 516 transmission (e.g., that is broadcast as a broadcast packet) can update its respective reservation system, so that each such node does not interfere with any of the cells included in the 6PX ACK 516 transmission.

In some of the various examples of distributed transmission resource allocation conflict reduction described herein, transmission resource conflicts that can occur in distributed transmission nodes of a network can be reduced. Reducing scheduling conflicts (if not actual collisions) can improve the network communication rate, and help avoid overloading the network when the network is operating at near capacity. Avoiding such collisions and overloading the network can reduce transmission latencies, as well as avoid disproportionate increases in latencies when the network is overloaded.

Moreover, avoiding collisions can increase the power efficiencies of low power devices employed as nodes on the network, where various intermediate nodes are used to forward messages to more distant nodes that might be out of range of a central node (e.g., network manager node) or intervening nodes. Power can be saved during transmissions by allowing nodes to extract scheduling information from communications not specifically addressed to a particular node (e.g., by use of the bypass module 224 and/or the 6PX ACK commands 416 and 516 described hereinabove.) Power can be saved by not requiring discovery of hidden nodes, as well as by not requiring scheduling commands to be promulgated point to point (thus any hidden node can schedule a transmission therefrom without requiring discovery of the particular hidden node beforehand).

Further, power can be saved by avoiding (in accordance with the techniques described herein) the operations of determining which nodes are in range of forwarding nodes, determining routing paths therebetween, and forwarding scheduling information in accordance with the routing paths. Such operations can be avoided, for example, because any node within reception range of a given node is also a node that can potentially interfere with transmissions from the given node. Accordingly, determining scheduling in any node in reception range (e.g., by using the bypass module 224 and/or 6PX ACK command) can reduce the possibility of any such node of interfering with transmissions of neighbor nodes.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A network element comprising:
   a transceiver configured to receive a packet, wherein the packet is an acknowledgement packet and includes a cell list field that specifies a set of cells;
   a storage; and
   a circuit coupled to the transceiver and to the storage, the circuit configured to:
      identify a first transmission resource in accordance with the packet as being reserved by a node pair, wherein the first transmission resource includes a cell list that includes the set of cells, each associated with a unique timeslot and channel combination;
      store, in the storage, an indication of the first transmission resource and of the node pair; and
      select a second transmission resource for transmission by the network element to be different from the first transmission resource;
      wherein the circuit is further configured to, in response to determining that the packet comprises scheduling commands, bypass filtering a media access control (MAC) address of the packet.

2. The network element of claim 1, wherein the set of cells are negotiated between network elements of the node pair to be reserved for use by the node pair.

3. The network element of claim 1, wherein the packet is addressed to the network element.

4. The network element of claim 1, wherein the packet is addressed to another network element.

5. The network element of claim 1, wherein the packet is a first packet, and the transceiver is configured to transmit a second packet on the second transmission resource.

6. The network element of claim 1, wherein determining that the packet comprises scheduling commands comprises determining that the packet comprises 6P commands or 6PX commands.

7. The network element of claim 1, wherein the first transmission resource comprises an absolute slot number (ASN).

8. The network element of claim 1, wherein the packet includes a number of cells field that specifies the number of cells in the set of cells.

9. The network element of claim 1, wherein the packet is a confirmation packet and includes a cell list field that specifies the set of cells.

10. A network node comprising:
    a transceiver configured to:
       transmit a first packet comprising a list of candidate allocable cells;
       receive a second packet comprising a list of mutually allocated cells, the list of mutually allocated cells being a subset of the list of candidate allocable cells; and
       broadcast an acknowledgement packet that includes a cell list field that specifies the list of mutually allocated cells;
       wherein the first packet is an ADD request further comprising a number of cells requested by the network node, wherein the acknowledgement packet further comprises the number of cells, and wherein the second packet is a response message further comprising a return code indicating whether the ADD request was successful.

11. The network node of claim 10, further comprising:
    storage; and
    a circuit coupled to the transceiver and to the storage, the circuit configured to store, in the storage, timeslot and channel combinations for the mutually allocated cells and a node pair, in accordance with the second packet.

12. The network node of claim 10, wherein the transceiver is further configured to receive an ADD request comprising a number of cells requested for allocation and an empty cell list, the network node further comprising a circuit configured to select the list of candidate allocable cells in accordance with the number of cells, wherein the first packet is a response message, the response message further comprising a return code indicating whether the ADD request was successful, wherein the second packet is a confirmation reply, the confirmation reply comprising a return code indicating whether the response message was successful.

13. A network node comprising:
a transceiver configured to receive a first packet comprising a list of candidate allocable cells; and
a circuit coupled to the transceiver, the circuit configured to select a subset of the candidate allocable cells to be a list of mutually allocated cells;
the transceiver further configured to:
transmit a second packet comprising the list of mutually allocated cells; and
receive an acknowledgement packet comprising the list of mutually allocated cells;
wherein the transceiver is further configured to transmit an ADD request comprising a number of cells requested for allocation and an empty cell list, wherein the first packet is a response message, the response message further comprising a return code further indicating whether the ADD request was successful, wherein the second packet is a confirmation reply, the confirmation reply comprising a return code indicating whether the response message was successful.

14. The network node of claim 13, wherein the first packet is an ADD request, the ADD request further comprising a number of cells requested by the network node, wherein the acknowledgement packet further comprises the number of cells, and wherein the second packet is a response message, the response message further comprising a return code indicating whether the ADD request was successful.

15. The network node of claim 13, further comprising storage, wherein the circuit is further configured to store, in the storage, timeslot and channel combinations for the mutually allocated cells and a node pair, in accordance with the second packet.

* * * * *